United States Patent [19]
Criley

[11] Patent Number: 4,846,487
[45] Date of Patent: Jul. 11, 1989

[54] TAILGATE STEP FOR PICKUP TRUCKS
[76] Inventor: Ronald L. Criley, Box 253, Lake City, Colo. 81235
[21] Appl. No.: 34,850
[22] Filed: Apr. 6, 1987
[51] Int. Cl.⁴ .............................................. B60R 3/02
[52] U.S. Cl. ................................... 280/166; 105/447; 296/62
[58] Field of Search ................... 280/163, 164 R, 166; 296/28, 62; 108/44, 48; 182/91, 92, 93; 105/447, 448

[56] References Cited
U.S. PATENT DOCUMENTS

| 1,118,584 | 11/1914 | Roebuck et al. | 280/163 |
| 3,394,947 | 7/1968 | Strube | 280/166 |
| 3,507,515 | 4/1970 | Brammer | 280/166 |
| 3,865,399 | 2/1975 | Way | 280/166 |
| 3,889,997 | 6/1975 | Schoneck | 296/62 |
| 3,927,903 | 12/1975 | Jones | 280/166 |
| 4,021,071 | 5/1977 | Norman | 296/62 |
| 4,108,457 | 8/1978 | Garrett | 280/166 |
| 4,161,997 | 7/1979 | Norman | 182/93 |
| 4,191,388 | 3/1980 | Barksdale | 280/166 |
| 4,194,754 | 3/1980 | Hightower | 280/166 |
| 4,639,032 | 1/1987 | Barbour | 296/62 |

FOREIGN PATENT DOCUMENTS
654777 3/1979 U.S.S.R. .............................. 182/91
181485 6/1922 United Kingdom ................... 296/62

Primary Examiner—Charles A. Marmor
Assistant Examiner—Brian S. Johnson
Attorney, Agent, or Firm—Ralph F. Crandell

[57] ABSTRACT

A foldable step for a pickup truck end gate or tailgate. The step is formed by a plurality of step rails secured between parallel side bars or frame members. A pair of depending riser arms or links are suspended from a pair of horizontal end gate arms or links to position the step about half-way between a lowered tailgate and the ground. The end gate arms are secured to brackets which are mounted on the interior tailgate surface. A toggle or jack knife linkage extending between the step and the riser arms holds the step in a generally horizontal position. The entire assembly may be folded flat to lie against the inner surface of the tailgate, and the assembly is locked in place with a locking clip or strap. The folded step may be folded into and retained in a recess in the inner surface of the endgate.

1 Claim, 3 Drawing Sheets

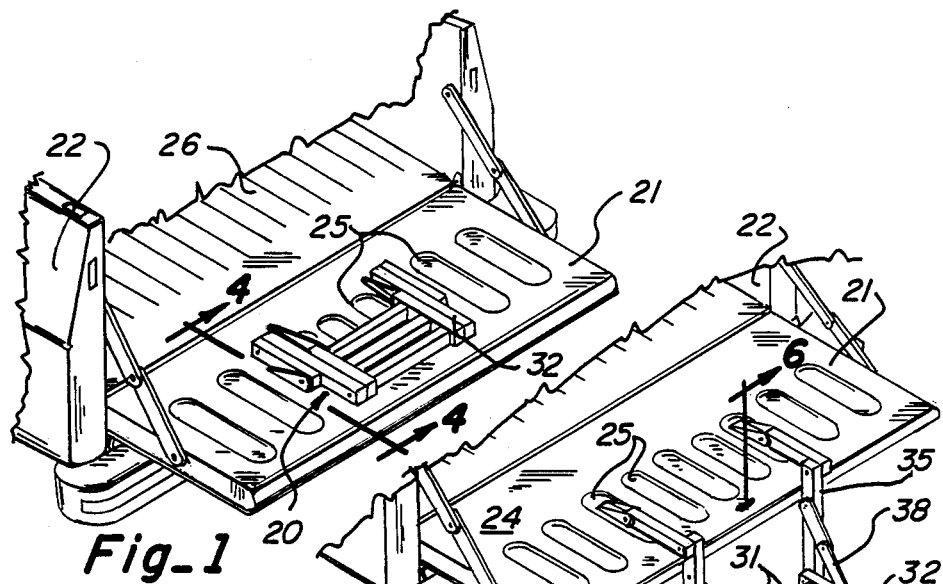
Fig_1
Fig_2
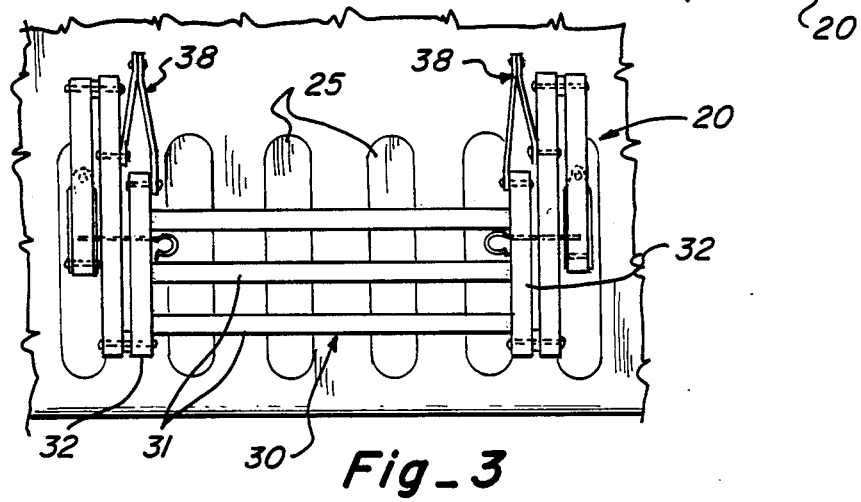
Fig_3
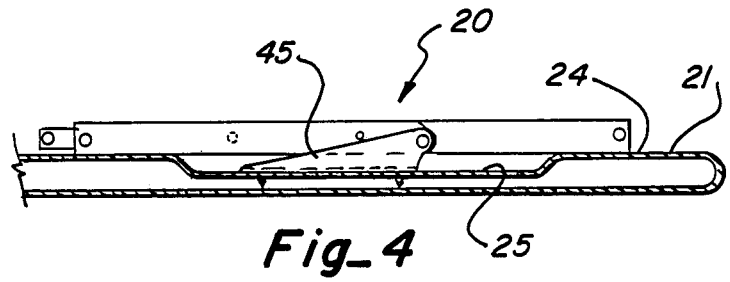
Fig_4

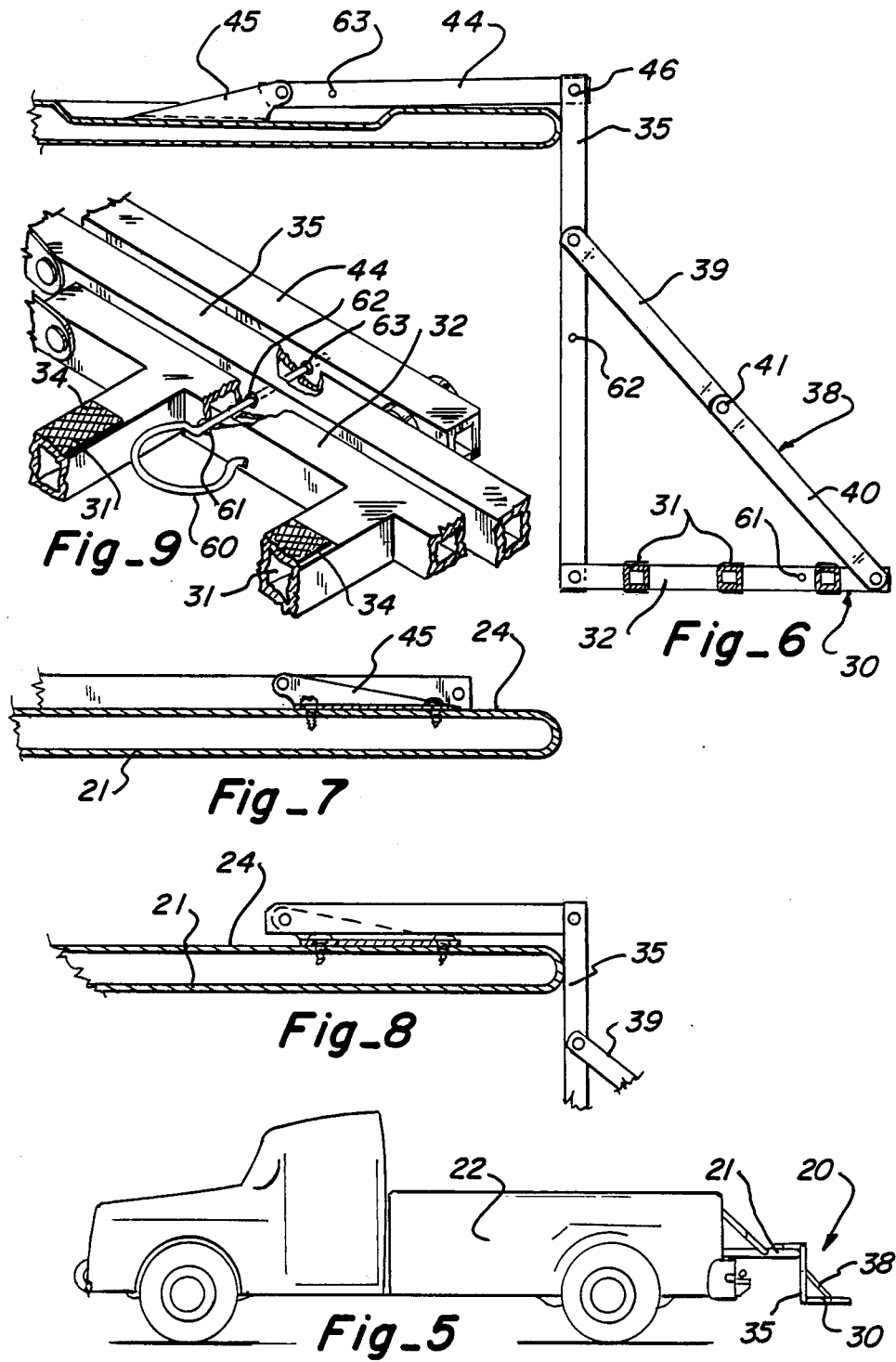

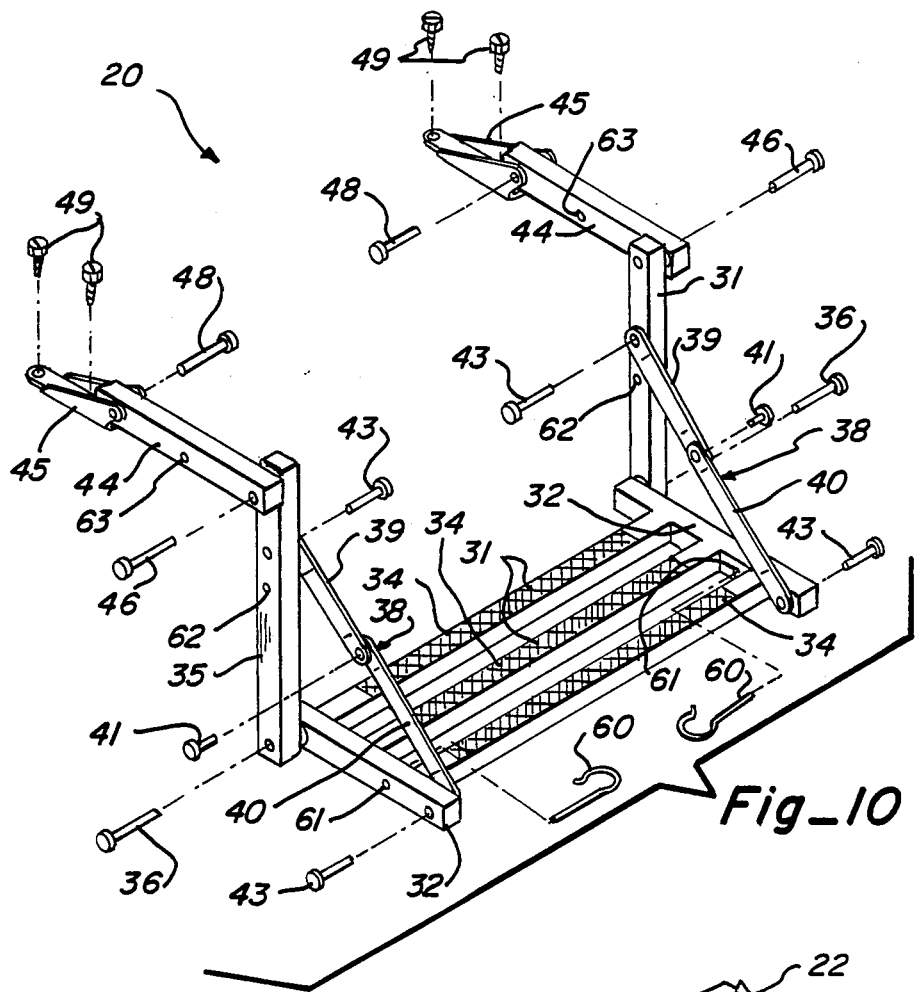
Fig_10
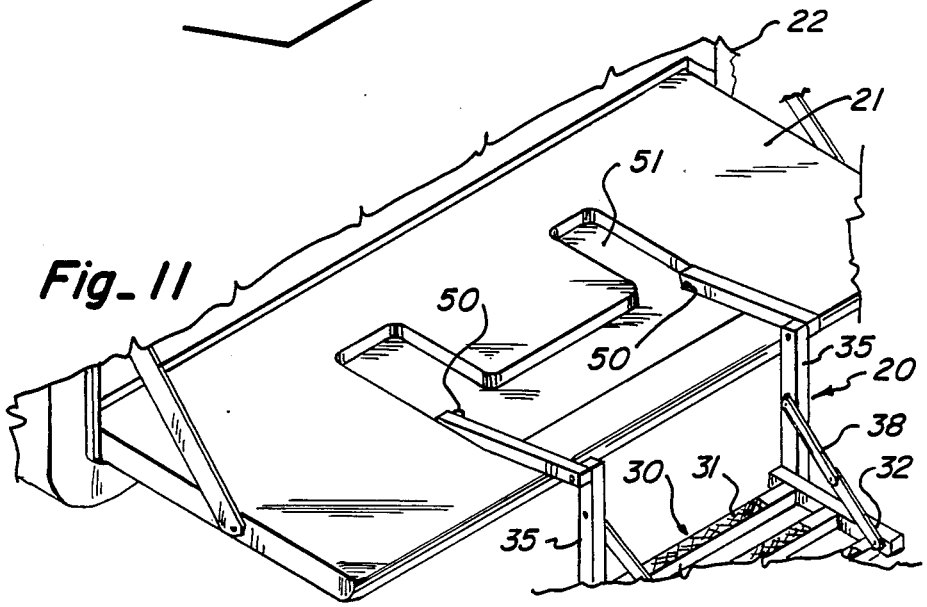
Fig_11

TAILGATE STEP FOR PICKUP TRUCKS

BACKGROUND OF THE INVENTION

1. Field of The Invention

The present invention relates to foldable and storable step structures for vehicles and more particularly to foldable steps for use on the end gate or tailgate of a pickup truck.

2. Description of the Prior Art

Most pickup trucks include a tailgate or end gate that, when opened, is approximately 30 inches above the ground upon which the vehicle is parked. This is a difficult climb to make when getting in and out of the vehicle bed, and most often requires a young and agile person to accomplish this without undue difficulty.

Folding steps for truck end gates are shown in U.S. Pat. Nos. 3,889,997; 4,161,997; and 4,191,388. Folding steps mountable on bumpers of campers and recreational vehicles are shown in U.S. Pat. Nos. 3,507,515; 3,394,947; 4,021,071; and 4,194,754.

OBJECTS AND SUMMARY OF THE INVENTION

It is the principal object of the present invention to provide an improved folding step mountable on the inner surface of the tailgate or end gate of a a pickup truck to facilitate climbing in and out of the truck bed.

Another object of the present invention is to provide a folding step of the foregoing character which stows flat against the inside surface of the tailgate when not in use, and can be opened or unfolded so as to hang from and below the tailgate to provide a step at a distance approximately one-half way between the tailgate and the ground.

It is a further object of the present invention to provide a tailgate step device of the foregoing type which presents minimal interference to the loading and unloading of articles from the vehicle.

Still a further object of the invention is to provide a tailgate step of the foregoing character that can be fully nested within a predefined recess in the inner panel of the vehicle endgate.

Still another object of the present invention, is to provide a tailgate step of the foregoing character which can be locked in the stowed, folded position against the inner bed surface of the tailgate.

Still another object of the present invention, is to provide a tailgate step of the foregoing character which is simple, rugged and requires only a minimal time to either stow or extend the step for use.

Other objects and advantages of the invention will become apparent as the following description proceeds.

The present invention is embodied in a foldable, stowable step for a pickup truck end gate or tailgate, which step may be folded and stowed flat against the interior surface of the pickup truck tailgate, and when the tailgate is lowered, the step may be unfolded and extended to hang over the edge of the tailgate to position a step panel approximately half way between the tailgate and the ground. A step panel is formed by a plurality of rails extending between and secured to spaced side beams or frame members. The step is pivotally secured at one edge to a pair of spaced vertical riser arms or links, adapted to extend vertically from the tailgate towards the ground. A toggle or jackknife linkage, composed of a pair of foldable links, extends between the outer edge of the step and a point intermediate the ends of each vertical riser link. The toggle linkage permits the step to be folded between the risers. The risers are, in turn, secured to the outer end of a pair of spaced end gate arms that are adapted to lie flat along the surface of an open tailgate. The end gate arms are pivotally secured to brackets mounted on the interior surface of the tailgate. In the open position, the step depends from the edge of the open tailgate, with the end gate arms lying horizontally along the inner surface of the opened tailgate. The step is positioned approximately half way between the plane of the tailgate and the ground and is held securely in a generally horizontal position by the toggle or jack knife linkages.

By collapsing the toggle linkage, the step may be folded upward between the riser arms, and the step and riser arm assembly then swung upwardly and inwardly to lie between the end gate arms. The entire assembly may then be folded back against the interior panel of the tailgate and locked in a stowed position.

In the stowed position, the various arms of the tailgate assembly are secured together with a locking clip or pin, or by appropriate straps or clamps, thereby securing the step to the tailgate. Some tailgates include recesses in which the step assembly may be mounted. For other tailgates, the bracket may be mounted flush on the inner panel of the tailgate. In its stowed position, the step assembly lies flat against the interior surface of the end gate in an out-of-the-way position that does not interfere with the load carrying capabilities of the pickup truck. The step assembly is particularly useful where it is necessary to climb into the bed of the truck for purposes of unloading or loading cargo therein. If desired, the pin connections between the end gate arms and the brackets may be removable so that the step can be removed for servicing or storage.

DESCRIPTION OF THE DRAWINGS

FIG. 1 is an isometric view of a portion of a pickup truck bed and associated tailgate, and illustrates a foldable, storable step embodying the present invention mounted on the inner surface of the tailgate.

FIG. 2 is a view similar to FIG. 1, but with the step unfolded and in its operative, open position.

FIG. 3 is an enlarged plan view of a portion of the tailgate and the foldable, storable step as shown in FIG. 1.

FIG. 4 is an end elevation view of the step and tailgate shown in FIG. 3.

FIG. 5 is an elevation view of a pickup truck with its tailgate opened and a foldable, storable step embodying the present invention extended therefrom.

FIG. 6 is an enlarged end elevation view of the step construction shown in FIG. 5.

FIG. 7 is an enlarged, partial end elevation view of the end gate and step shown in FIG. 3.

FIG. 8 is a view similar to FIG. 7 but with the tailgate in the extended position.

FIG. 9 is an enlarged fragmentary view of one end of the tailgate step construction shown in FIG. 3 with parts broken away for clarity.

FIG. 10 is an enlarged, partially exploded isometric view of the tailgate step construction shown in FIG. 6.

FIG. 11 is a modified form of tailgate step construction adapted for use with a tailgate having a recessed inner panel.

DESCRIPTION OF THE PREFERRED EMBODIMENT

A stowable, foldable tailgate step construction embodying the present invention is shown in the drawings. The step assembly 20 is adapted to be mounted on the tailgate or end gate 21 of a pickup truck 22. The collapsible, foldable, stowable step is secured to the inside or inner surface 24 of the tailgate 21. A variety of step configurations may be provided where the tailgate includes various recesses 25 formed in its inner surface 24. The step is stowable as shown in FIG. 1 so that it takes up a minimum amount of space in the truck bed 26 when the tailgate is closed, and can be readily extended and placed into useful position as shown in FIG. 2 when the tailgate or end gate 21 is opened and lowered. A conventional pickup truck tailgate is normally about 30 to 36 inches off of the ground. By unfolding the tailgate step, easy access can be obtained to the truck bed.

The step assembly 20 comprises a step 30, associated supporting links or arms and mounting brackets. The step 30 is formed by a plurality of step rails 31 extending between and secured to a pair of side bars 32. The rails 31 and side bars 32 may be of any appropriate configuration, being shown generally as square in cross section. Non-skid surfaces 34 may be provided on the upper edge or surface of the step rails 31.

For supporting the step 30 from the tailgate 21 when the tailgate is in its open, horizontal position, there is provided a pair of depending vertical riser links 35, each of which is pivotally secured to one of the side bars 32 at one end thereof by appropriate pivot pins 36. The vertical riser links 35 are secured at their lower ends to corresponding inner ends of the step side bars 32, that is the ends of the step side bars closest to the truck. For holding the step 30 at a generally right angle with respect to the vertical riser bars 35, toggle or jackknife links 38 are secured between the forward ends of the step 30 and the vertical riser links 35 at point intermediate the ends of the vertical riser links 35. The jackknife links 38 each include two link sections, an upper section 39 pivoted at one end to the riser links 35 and a lower end 40 pivoted at its lowermost end to the forward end of a step side bar 32. The adjoining ends of the toggle links 39 and 40 are pivoted together by a pivot pin 41, and are pivoted to the riser links and step by pivot pins 43. With the foregong construction, the step 30 can be folded to lie between the side riser links 35 with the toggle link 38 being pivoted to extend outwardly and upwardly along side the riser links 35, as shown in FIG. 3.

At its upper end, each riser link 35 is pivotally secured to a horizontal tailgate link 44 that in turn is pivotally mounted to a tailgate mounting bracket 45 secured to the inner surface 24 of the tailgate or end gate 21. The tailgate links 44 are pivotally secured, by a pivot pin 46, at their outer ends to the upper ends of the step riser links 35. The tailgate links are secured to the outer sides of the riser links so that the tailgate step and riser links can be folded together to nest or lie between the horizontal tailgate links 44. The tailgate links 44 are in turn pivotally secured to the mounting brackets 45 by pivot pins 48, and the brackets are secured to the inner or interim surface by fasteners such as metal screws 49.

The foldable step 20 embodying the present invention is particularly suitable for installation in a preformed recess in the inner panel of the truck tailgate as shown in FIG. 11. The step is thin, light in weight and folds flat to a depth equal to the thickness of the step panels and links. By preforming or defining a shaped recess in the inner panel of the tailgate, and mounting the step in this recess, the step can be folded flush with the inner surface of the tailgate. It is thereby storeable without taking up any load area of the truck bed. As shown in FIG. 11 the inner panel 24 of the tailgate 21 is formed with a recess 51 adapted to receive a folded tailgate step 20. When folded the horizontal tailgate bars 44 are pivoted either directly to the tailgate 21 by pivot pins 50 or by suitable brackets (not shown) secured within the recess 51. With such a preformed recess, the step folds flush with the inner surface of the tailgate. The preformed tailgate recess may be formed as original equipment or an accessory tailgate panel may be provided.

As shown in FIG. 6, the mounting bracket may be mounted in a depression formed in the inner surface of the tailgate, or as shown in FIGS. 7 and 8, where no depression is provided in the tailgate, the mounting brackets may be positioned directly on the inner tailgate surface. The mounting bracket itself provides for a variety of mounting positions, depending on the tailgate configuration.

When the step has been collapsed and folded flat against the inner surface of the tailgate, it may be locked in place by utilizing a locking clip or pin 60 which extends through appropriately aligned holes 61, 62 and 63 in the step side bars, vertical step riser links, and horizontal end gate arms or links, respectively. A variety of other mounting and clamping devices may be utilized, such as a strap or bracket extending across the step or one of the rails thereof to hold the steps securely against the tailgate. In its lowered, operative position, the jackknife or toggle links hold the step horizontal and securely against collapse. The riser arms also bear against the outer edge of the tailgate to prevent the step from swinging back under the tailgate when in operative position.

To prevent the tailgate from rattling when stowed, various pads and bumpers (not shown) may be utilized. The step assembly may be made out of any appropriate material, including steel, wood and high impact, high strength plastic.

While a certain illustrative foldable pickup step has been shown in the drawings and described above in considerable detail, it should be understood that there is no intention to limit the invention to the specific forms disclosed. On the contrary, the intention is to cover all modifications, alternative constructions, equivalents and uses falling within the spirit and scope of the invention as expressed in the appended claims.

What is claimed is:

1. A foldable step assembly for a truck end gate having an inner edge and an outer edge and being movable between a closed vertical position and an open horizontal position, comprising in combination, a pair of brackets secured in spaced apart relation to the inside surface of the truck end gate approximately midway between the inner and outer edges thereof, a pair of elongated end gate links each pivotally secured at one end to one of said brackets and adapted to pivot about said bracket between first and second axially aligned positions extending generally horizontally along the surface of said end gate, in said first position said end gate links having an end thereof positioned to overhang the outer edge of said end gate when said end gate is in the open horizontal position, a pair of depending step riser links of a greater length than said end gate links, each of said step riser links be pivotally secured at its upper end to the respective overhanging end of one of said end gate links, a horizontal step panel formed from a pair of side bars and a plurality of step rails extending between and secured to the side bars, means pivotally securing each of said step panel side bars to a lower depending end of one of said riser links, means extending between said step panel side bars and the riser link to which the riser link is pivotally secured for selectively and foldably maintaining said step panel in a horizontal position in a plane lying substantially midway between the ground and the truck end gate when the truck end gate is in its open horizontal position, said step panel being foldable upwardly to a position completely between said riser links, and the entire folded assembly being foldable horizontally with the end gate links in the second position to lie flat along the inner surface of said end gate with the links and step panel lying between said brackets and spaced away from the outer edge of said end gate, the entire foldable step assembly when in the folded condition being of a thickness that is no greater than the thickness of any one of the end gate links, the riser links and the side bars and means for securing said step panel, riser links and end gate links together when said step panel is in the folded condition so that said folded step panel will remain in place on said end gate when said end gate is raised to a vertical position, said securing means comprising means defining aligned apertures in each of said brackets, end gate links, riser links and step panel side bars, and a locking pin adapted to releasably extend through said apertures for locking said step panel, links and bracket in the folded position.

* * * * *